United States Patent [19]
Tanaka et al.

[11] Patent Number: 4,789,227
[45] Date of Patent: Dec. 6, 1988

[54] ZOOM LENS

[75] Inventors: Tsunefumi Tanaka; Keiji Ikemori, both of Kanagawa; Masatake Kato; Kazuo Tanaka, both of Tokyo, all of Japan

[73] Assignee: Canon Kabushiki Kaisha

[21] Appl. No.: 107,876

[22] Filed: Oct. 8, 1987

Related U.S. Application Data

[63] Continuation of Ser. No. 519,688, Aug. 2, 1983, abandoned.

[30] Foreign Application Priority Data

Aug. 6, 1982 [JP] Japan ................................. 57-137059
Oct. 21, 1982 [JP] Japan ................................. 57-185291

[51] Int. Cl.⁴ .......................................... G02B 15/00
[52] U.S. Cl. ..................................... 350/427; 350/428
[58] Field of Search ................. 350/423, 427, 428, 430

[56] References Cited

U.S. PATENT DOCUMENTS 3,661,445  5/1972  Someya ............................. 350/428

Primary Examiner—John K. Corbin
Assistant Examiner—P. M. Dzierzynski
Attorney, Agent, or Firm—Toren, McGeady & Associates

[57] ABSTRACT

A zoom lens which performs focusing by using part of a movable lens unit. In zooming, a lens unit V for changing the focal length of the entire system and another lens unit C for maintaining the constant position of an image plane move in certain relation to each other. For all objects in the focusing range, a part of either the aforesaid lens unit V or the aforesaid lens unit C is made to move to effect focusing at any station in the entire zooming range, thereby the zoom lens can be constructed in compact form.

7 Claims, 10 Drawing Sheets

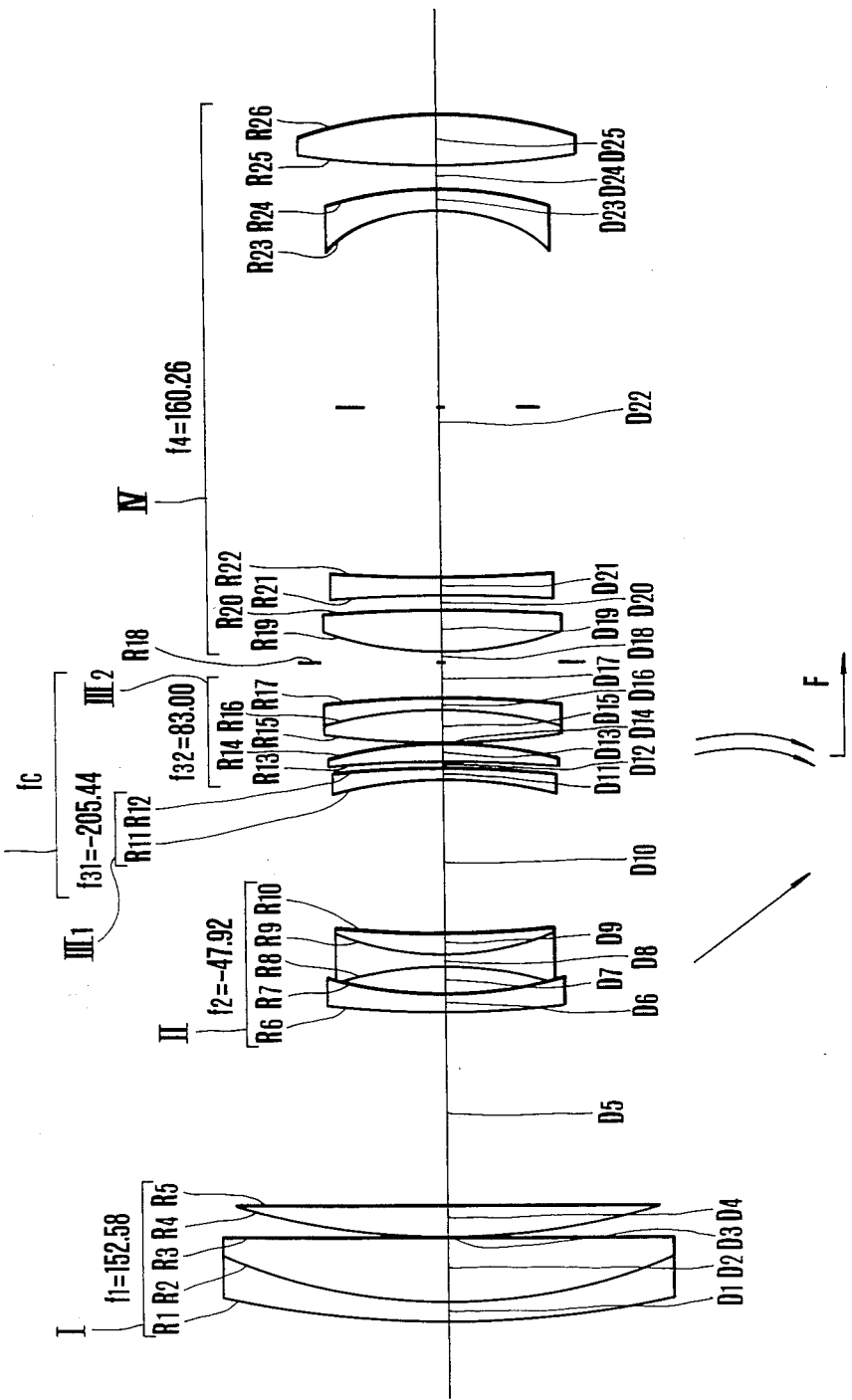

FIG.3(a)
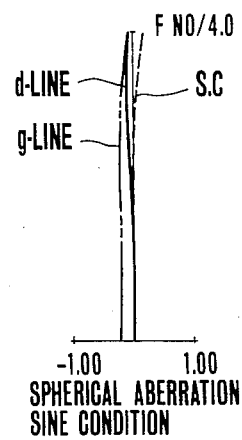
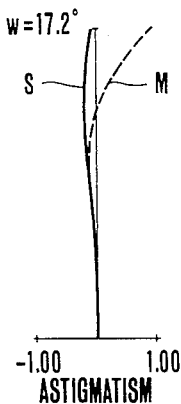
FIG.3(b)
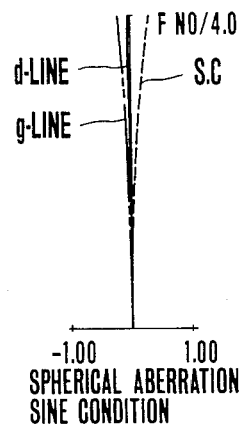
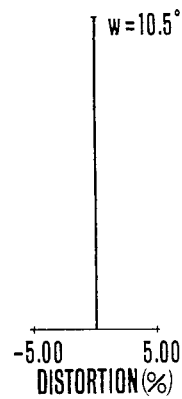
FIG.3(c)
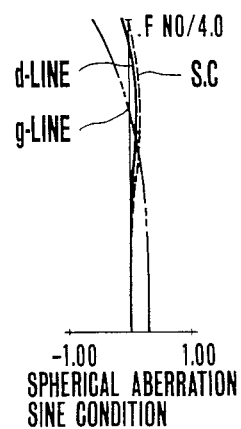
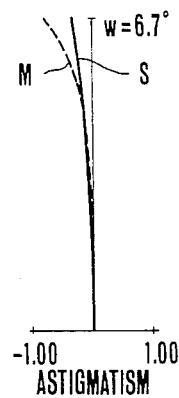
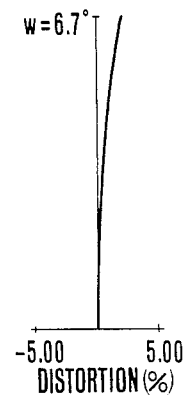

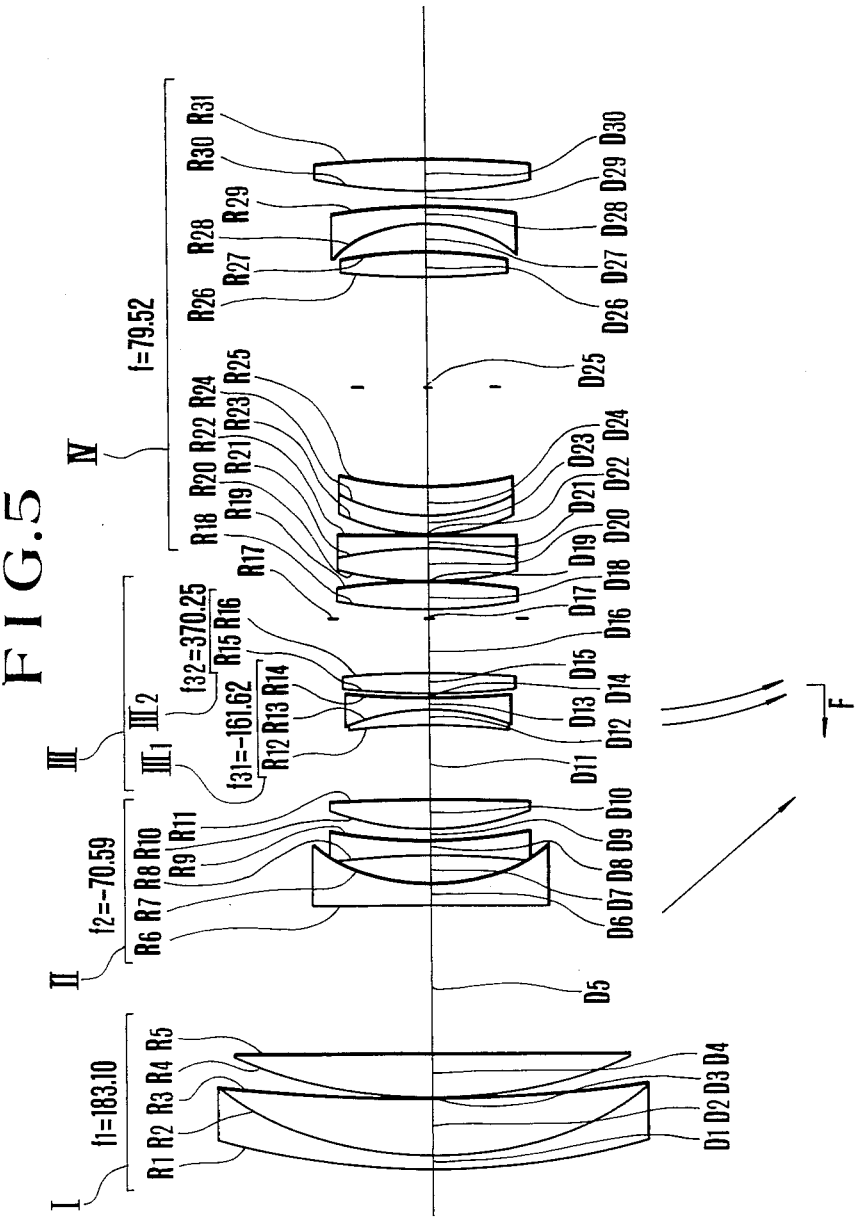

FIG.7(a)
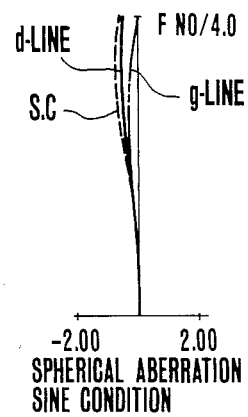
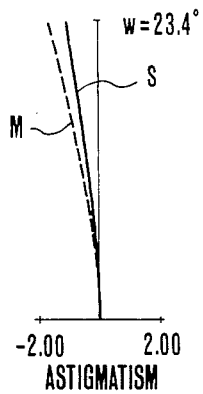
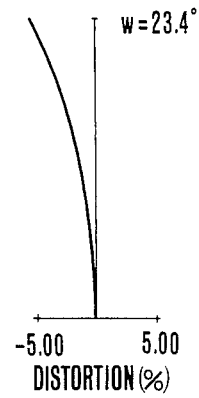
FIG.7(b)
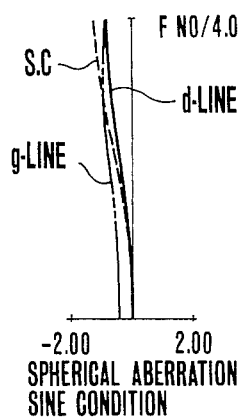
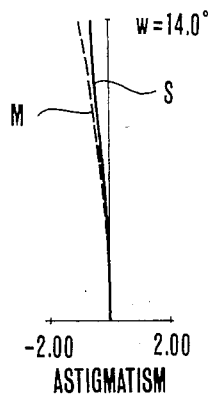
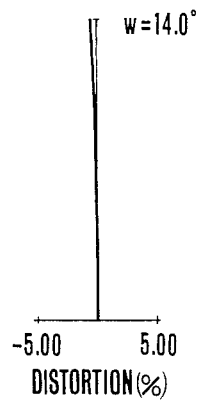
FIG.7(c)
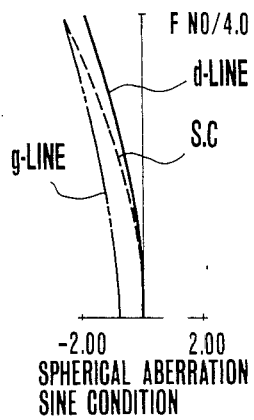
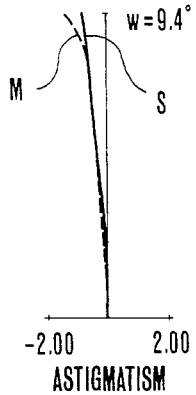
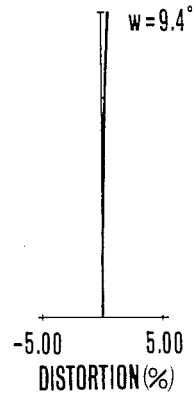

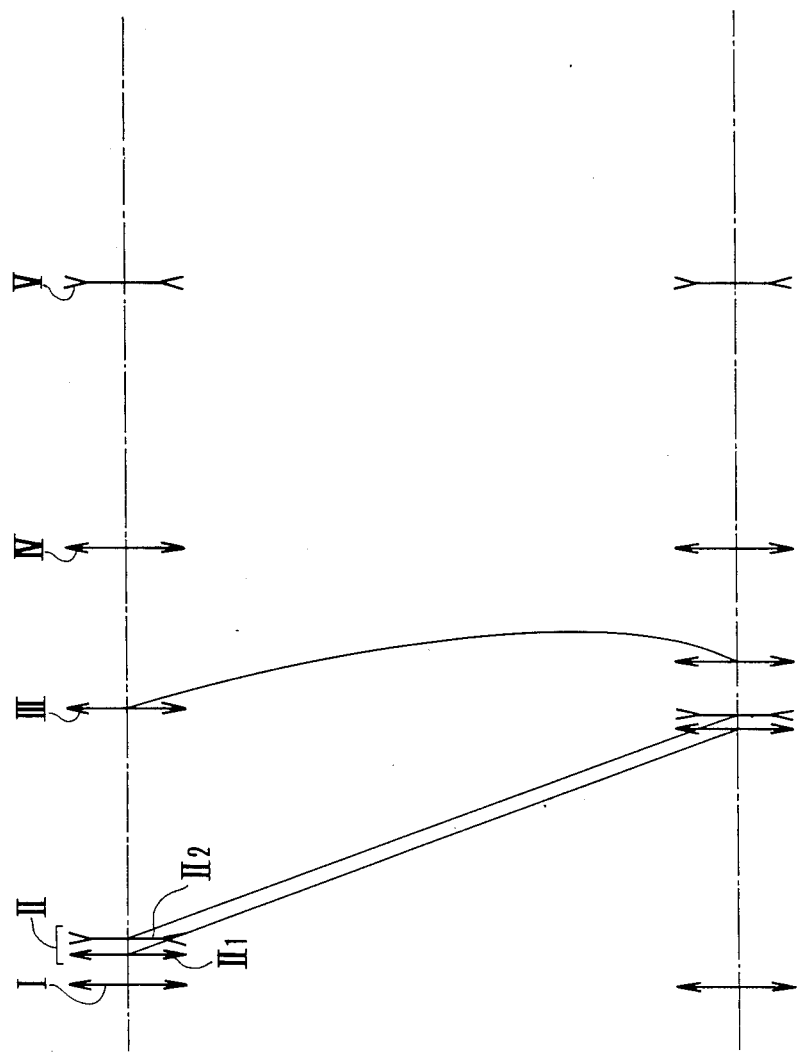

s=29.4  t=35.364

ZOOM LENS

This is a continuation of application Ser. No. 519,688, filed Aug. 2, 1983 now abandoned.

BACKGROUND OF THE INVENTION

1. Field of the Invention

This invention relates to zoom lenses, and more particularly to zoom lenses in which focusing is performed by using a part of a lens unit which moves axially in zooming.

2. Description of the Prior Art

In the prior art of zoom lenses, the so-called front focusing method has prevailed in which for focusing a front lens unit or one ahead of the zooming lens group is used. The zoom lenses having such focusing provision have the advantage that, regardless of zooming with changes in the focal length of the entire system, the focusing movement for the same object disatance, as measured from a position for an infinitely distant object, is always constant. However, this system has the following drawbacks:

(i) The weight of the focusing lens becomes heavy.
(ii) The total focusing movement becomes extended.
(iii) The range of variation of aberrations with focusing is usually widened.
(iv) It is difficult t take the closest possible focusing object distance at a shorter value than ever before.

In general, improvements with respect to (iii) and (iv) worsen (i) and (ii), and it is particularly unsuitable to use as the optical system for auto-focus cameras.

To overcome such difficulties, it has been proposed that a lens unit which moves in zooming is used, or a lens unit that lies behind on an image side thereof is used to effect focusing. This method, when employed in a camera having an automatic focusing drive system, is advantageous since the loads on the motor and battery can be reduced. However, the use of the lens unit, which moves in zooming, for focusing often causes a problem in which due to the principles of design of the entire optical system, the refractive power of that lens does not have an adequate value so as to allow it to be used for focusing.

For example, in the cases where a variator lens for the image magnification, is used in focusing, since its refractive power is excessively strong, the focusing accuracy is decreased at wide angle positions. In the cases where a compensator lens is used, its refractive power is too weak to prevent the focusing speed from dropping when at telephoto positions.

Further, in this prior art focusing method, for one and the same object distance, the focusing unit has to be moved different distances to meet different focal lengths of the entire system. The distance the focusing unit moves from the position with an object at infinity varies with the focal length either in such a relation as in a curve of secondary degree, or in a discontinuous way. Then, as the object distance changes, the curve of secondary degree changes its shape. For this reason, an operating mechanism, which allows the same angle of rotation of the distance adjusting ring to effect focusing at all focal length positions over the entire zooming range, tends to be very complicated in structure, and is very difficult to realize economically. This tendency rapidly becomes significant as the zoom ratio increases.

Next taking an example of the conventional 4-unit zoon lens, the moving distances of the focusing unit for focusing by each lens unit are shown in FIG. 1. The zoom lens in FIG. 1 is specified to have the focal lengths f1, f2, f3 and f4 for the first to fourth units, respectively, along with the intervals l1, l2 and l3 between the successive two principal points of the units during zooming with an object at infinity as follows:

| $f_1$ | $f_2$ | $f_3$ | $f_4$ |
|---|---|---|---|
| 100 | −40 | 111.167 | 121.273 |
| f | $l_1$ | $l_2$ | $l_3$ |
| 80 | 10 | 44.5 | 15 |
| 144 | 36.67 | 23.17 | 9.67 |
| 200 | 46 | 4.5 | 19 |

With the zoom lens of FIG. 1(a), where the second unit of negative power and the third unit of positive power are moved to effect zooming, when the first unit is selected for focusing purposes, as is widely accepted in the prior art, the focusing movement for one and the same object distance remains unchanged from a constant value at any station during zooming, as illustrated in FIG. 1(b). But when the focusing provision is made at one of the second to fourth units, it changes as illustrated in FIGS. 1(c), 1(d) and 1(e).

As zooming goes from the wide angle to the telephoto position, the second unit changes its function from a reducing system to an enlarging system past a point of unity of magnification. Since the second unit is of negative power, there results, therefore, in that part of the range of movement which provides the reducing system where the second unit has to be moved forward as focusing is effected down to shorter object distances, in the other part which provides the enlarging system, that it has to be moved rearward, and in the intermediate point for unity of magnification, that focusing becomes uncertain, a discontinuous focusing movement as illustrated in FIG. 1(c).

In the case of the third unit which is made also to serve for the focusing, since, in this conventional example, the zoom section (first to third units) is designed to be an afocal system, as the object distance decreases, the paraxial rays of light emerging from the third unit become divergent (at this time, this group serves as an enlarging system of positive sign). Therefore, it is only necessary to move the third unit rearward so that the diverging rays revert to parallel ones as illustrated in FIG. 1(d).

In the case of the fourth unit, the arriving rays are parallel to each other, and, therefore, it is only necessary to move the unit forward. However, since the afocal magnification increases or decreases with zooming, the value of the focusing movement differs with different focal lengths of the entire system as illustrated in FIG. 1(d). In this case, the distance the fourth lens unit moves to effect focusing is proportional to the square of the afocal magnification.

It should be also recognized that as the object approaches the lens (5m→2m), the total curvature of the curve of secondary degree becomes progressively more intensive.

In actual practice, therefore, to achieve focusing within the framework of the above-described zoom lens configuration by one of the second unit and those units that follow, it is required to make use of a three-dimensional cam or the like in the operating mechanism so that the curve of secondary degree, which represents variation of the focusing movement with zooming, varies in the total curvature with the object distance.

By fulfilling this requirement, the angle of rotation of the focusing ring can be made the same for one and the same object distance regardless of what focal length of the entire system may be. Otherwise, either means such as a computer circuit or the TTL auto-focus mechanism, must be provided for controlling the focusing operation electrically.

Apart from the above-described varieties of the focusing provision, it is also known in the art to provide a macrofocusing means by moving a lens member constituting part of a varifocal lens unit as disclosed in U.S. Pat. No. 3,661,445. As such, apart from the lens for focusing within the normal object distance range, in order to allow for focusing on a closeup subject, the varifocal lens unit after having been set in the telephoto position, as a whole is made movable in part.

SUMMARY OF THE INVENTION

An object of the present invention is to provide a zoom lens with a relatively short total focusing movement rendering a focusing mechanism suitable to, for example, the in-focus detecting device and the focusing drive device.

Another object is to provide a zoom lens having a focusing provision which is not subject to restriction by the zooming position and the object distance range.

Still another object is to provide a zoom lens having such a focusing provision which will not greatly change the total focusing movement over the entire zooming range. In other words, a focusing provision such that the total focusing movement in the telephoto positions is reduced by a large distance.

To accomplish these objects, according to the present invention, when focusing the zoom lens, an independent movement is imparted into part of either one of the lens unit V axially movable for variation of the image magnification, and the lens unit C for maintenance of an image plane in the constant position during zooming. In the case where the aforesaid lens unit V is made movable in part to effect focusing, the one of the lenses constituting the lens unit, V which has a smaller power than the total power of the lenses, in the lens unit V is selected for employment as a focusing lens. In the other case where the aforesaid lens unit C is made movable in part to effect focusing, the one of the lenses constituting the lens unit C which has a larger power than the total power of the lenses in the lens unit C is selected for employment as a focusing lens.

It should be recognized that the zoom lens of the invention is designed in such a way that the one of the varifocal unit and image shift compensating unit, which is given the focusing provision, if one in number, is constructed in the form of a plurality of lens elements, whereby when in zooming, all of the aforesaid lens elements are moved as a unit, and when in focusing, some of the lens elements are moved while the remaining one or ones are stationary during focusing. If that unit which has the focusing provision otherwise consists of two or more sub-units which are axially movable in different relation to each other during zooming, one of the sub-units is made movable to effect focusing. It is to be noted in this connection that if that sub-unit which has the focusing provision is constructed with a plurality of lens elements, focusing can be made in two different ways by moving some of the lens elements, or by moving all the lens elements as a whole.

The making of the focusing provision at part of one of the zoom units, or the variator and compensator, sets forth the principle of construction of a zoom lens according to the present invention which has some advantages. One such advantage is that an appropriate refractive power can be given to the focusing lens, thereby reducing the total focusing movement is to permit a valuable decrease in the bulk and size of the entire system.

Another advantage is that, since a lens unit for focusing corrected for good stability of aberrations moves in a range which covers or overlaps the range of zooming movement thereof, in order to achieve maintenance of good stability of aberration correction throughout the zooming range, there is only need to make up a suitable design of the other zoom unit which remains stationary during focusing than that including the focusing lens unit. In other words, variation with zooming of the aberrations and variation with focusing of the aberrations can be corrected by respective individual separate lens units from each other.

As such, a zoom lens well corrected for high grade imaging performance throughout the entire zooming range and throughout a greatly extended focusing range alike can be achieved.

BRIEF DESCRIPTION OF THE DRAWINGS

FIG. 2 is a longitudinal section view of a first embodiment of a zoom lens according to the present invention.

FIGS. 3(a) (b) (c) and FIGS. 4(a) (b) (c) are graphic representations of all aberrations of the lens of FIG. 2.

FIG. 5 is a longitudinal section view of a second embodiment of the zoom lens according to the present invention.

FIG. 8 is a schematic view of a third embodiment of the zoom lens according to the present invention.

DESCRIPTION OF THE PREFERRED EMBODIMENTS

Discussion is first had regarding a case where the focusing provision is made in part of a unit of lens members which are moved as a unit during zooming.

In this case, when the aforesaid movable lens unit has the duty of compensating for the image shift, letting $f_C$ denote the focal length of the lens unit and $f_F$ the focal length of that part of the lens unit which is movable for focusing, it is desired to satisfy the following condition:

$$|f_C| > |f_F|$$

Otherwise when the aforesaid movable lens unit has the duty of varying the image magnification, letting $f_V$ denote the focal length of the lens units and $f_F$ the focal length of that part of the lens unit which is movable for focusing, it is desired to satisfy the following condition:

$|f_F| > |f_V|$

The above-stated inequalities of condition provides assurance that the spaces necessary for the lens unit and the lens member or members thereof to perform zooming and focusing respectively are advantageously superimposed one upon another. This contributes to an advance in the compactness of the zoom lens as a whole. Therefore, when the condition is violated no improved results are attained because a wasteful air space is created between the lens units.

The present invention is next described in connection with specific embodiments thereof by reference to the drawings. In FIG. 2 there is shown a first example of a specific zoom lens of the invention where the system comprises, from front to rear, a first lens unit I of positive power which is stationary during focusing and zooming, a second lens unit II of negative power axially movable for varying the focal length of the entire system when zooming, a third lens unit III of positive or negative power axially movable to compensate for the image shift resulting from zooming to maintain the constant position of an image plane, and a fixed fourth lens unit IV, wherein the third lens unit III is divided into two parts or front and rear parts III$_1$ and III$_2$, respectively, which are moved as a unit when zooming, whereby focusing is performed by imparting an independent movement to either one of the two parts, in this instance, the rear part III$_2$.

Figure 1A:
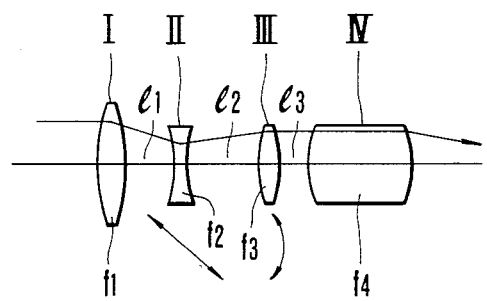
FIGS. 1(a) (b) (c) (d) (e) illustrate how to move the focusing lens member in connection with an example of the conventional zoom lens.
Figure 1B:
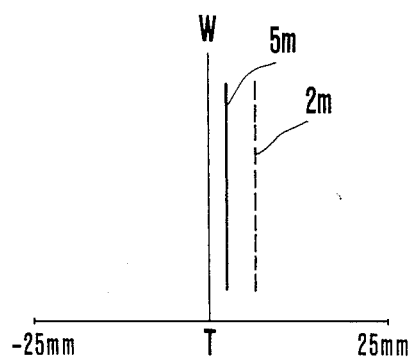
Figure 1C:
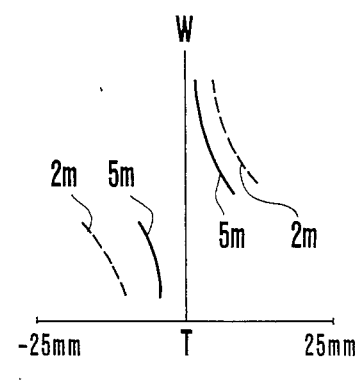
Figure 1D:
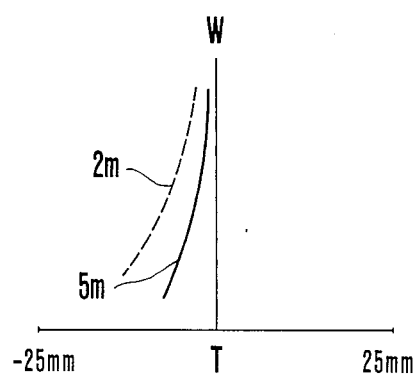
Figure 1E:
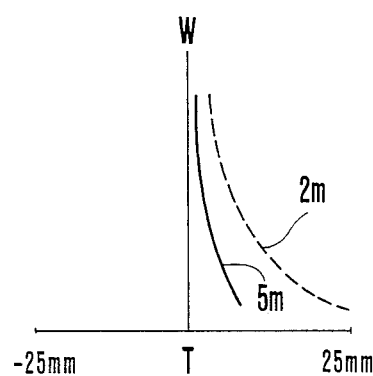
Figure 4A:
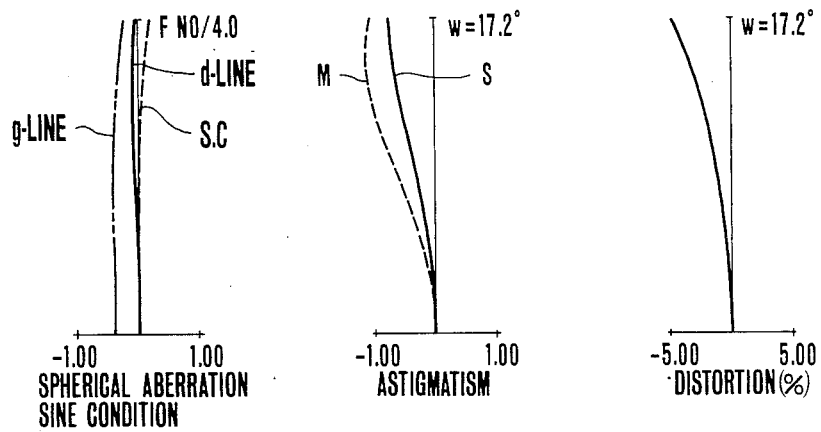
Figure 4B:
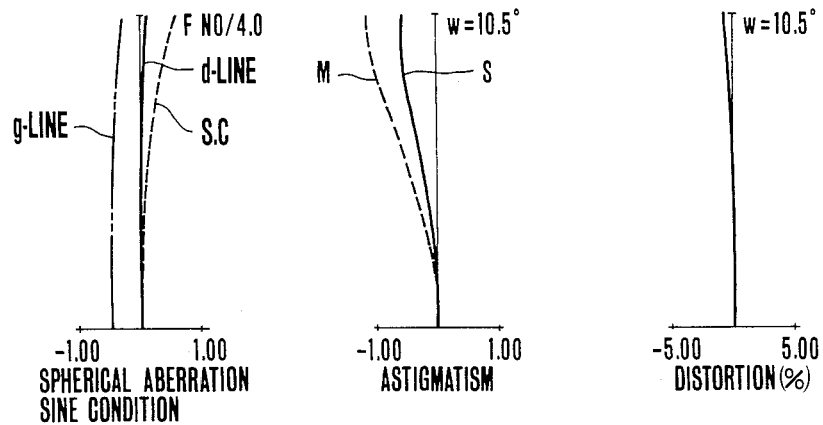
Figure 4C:
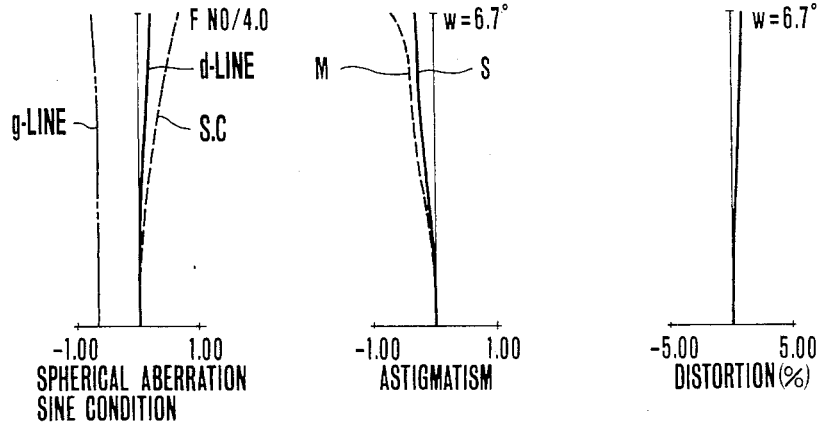

FIGS. 3(a), 3(b) and (3c) graphically illustrate all aberrations of the zoom lens in the wide angle, intermediate and telephoto positions, respectively, with an object at infinity. FIGS. 4(a), 4(b) and 4(c) are similar to FIG. 3 except that the object distance is 1.5 meters, wherein the astigmatism for the sagittal image surface is indicated at S, and that for the meridional image surface at M.

It should be recognized that the herein stated rule or feature of the invention can be readily applied to lenses of the other types where the second and/or third lens unit each are, or is constructed with two or more subunits which are moved in different relation to each other during zooming.

In Example 1, the third lens unit is given a positive refractive power, and may be considered comprising, from front to rear, a first part of negative power and a second part of positive power, of which the second part is made movable to effect focusing. By this, the refractive power of the focusing lens assembly is allowed to take a larger value than the overall power of the third lens unit with an advantage that the total focusing movement can be reduced to effect an equivalent focusing range.

Another or second example of the specific lens of the invention is shown in FIG. 5 where the third lens unit has a negative refractive power and is divided into two parts of which the first III$_1$, counting from the front, is a negative doublet and the second III$_2$ is a positive singlet. Focusing is performed by moving the front part or negative doublet III$_1$.

Figure 6A:
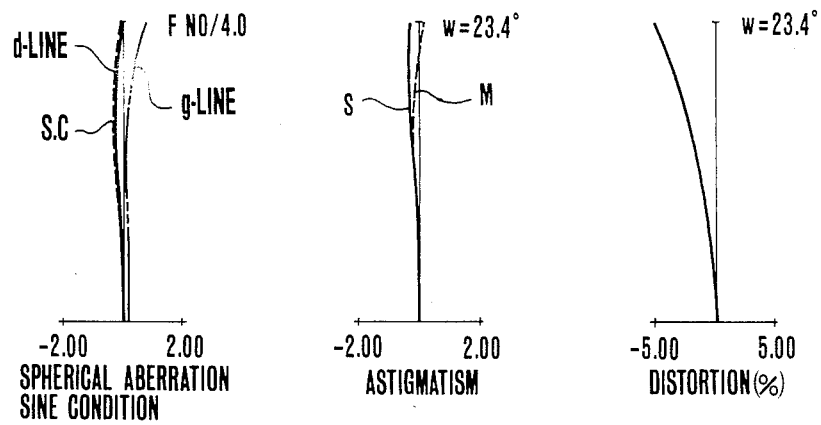
FIGS. 6(a) (b) (c) and FIGS. 7(a) (b) (c) are graphic representations of all aberrations of the lens of FIG. 5.
Figure 6B:
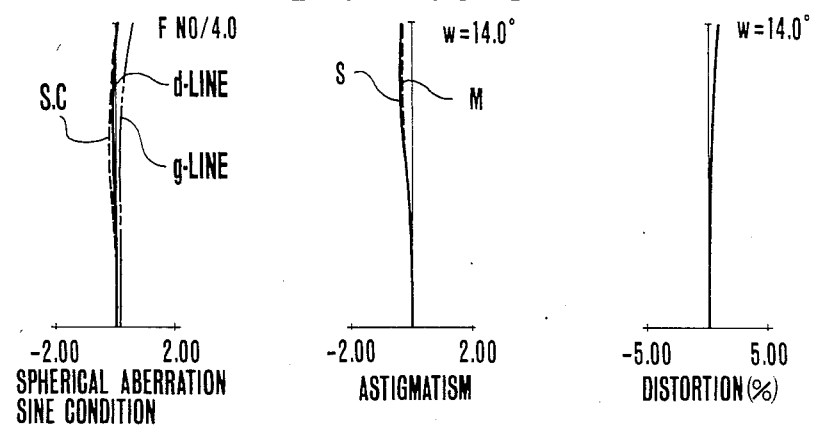
Figure 6C:
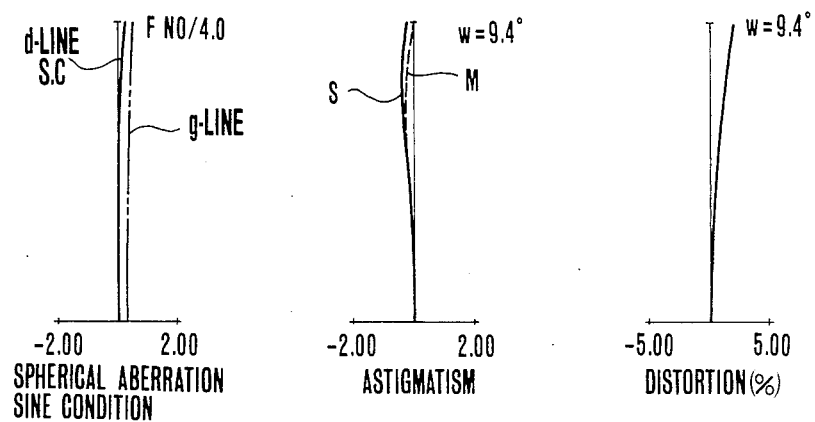

All aberrations of the lens of FIG. 5 are illustrated in FIGS. 6(a) to 6(c) for focusing on an object at infinity and in FIGS. 7(a) to 7(c) for an object at a distance of 1.5 meters.

It should be pointed out that in the above-described two specific examples as compared with the refractive power of the third lens unit, the refractive power of the focusing lens unit or member is large so that the distance it moves from one terminal end to the other can be shortened. By this, the otherwise necessary dead air space in the lens system is minimized to shorten the entire lens system in the longitudinal direction which, in turn, serves to shorten the diameter of the front lens members.

It is to be noted that the first and second specific zoom lenses represent examples of employment of that one of the two zoom units which has the function of maintaining the constant position of the image plane, or the so-called compensator in making the focusing provision in one of the divided parts thereof, but the variator otherwise may be employed to effect an equivalent result. However, since, the compensator moves at a slower speed during zooming, the use of the compensator for focusing purposes makes it easier to solve the aberrational problem, allows for a reduction of the number of lens elements, which in turn reduces manufacturing errors.

The numerical data in accordance with which Examples 1 and 2 of the specific zoom lenses can be constructed, are given in the following tables for the radii of curvature, R, the lens thicknesses and air separations, D, and the refractive indices, N, and the Abbe numbers, $\nu$, of the glasses of the lens elements with the subscripts numbered consecutively from front to rear.

EXAMPLE 1

| F = 100–260 | FNO = 1:4.0 | $2\omega$ = 13.4°–34.4° | |
|---|---|---|---|
| R1 = 194.247 | D1 = 3.51 | N1 = 1.80518 | $\nu$1 = 25.4 |
| R2 = 95.086 | D2 = 11.91 | N2 = 1.61272 | $\nu$2 = 58.7 |
| R3 = 4321.699 | D3 = 0.14 | | |
| R4 = 134.620 | D4 = 5.67 | N3 = 1.61272 | $\nu$3 = 58.7 |
| R5 = −5148.492 | D5 = Variable | | |
| R6 = 265.195 | D6 = 2.82 | N4 = 1.71300 | $\nu$4 = 53.8 |
| R7 = 63.958 | D7 = 5.23 | | |
| R8 = −67.901 | D8 = 2.26 | N5 = 1.71300 | $\nu$5 = 53.8 |
| R9 = 51.173 | D9 = 3.90 | N6 = 1.84666 | $\nu$6 = 23.9 |
| R10 = 215.299 | D10 = Variable with focusing | | |
| R11 = −91.080 | D11 = 1.93 | N7 = 1.71300 | $\nu$7 = 53.8 |
| R12 = −242.954 | D12 = Variable | | |
| R13 = −265.921 | D13 = 4.52 | N8 = 1.72000 | $\nu$8 = 50.2 |
| R14 = −69.415 | D14 = 0.11 | | |
| R15 = 138.278 | D15 = 6.42 | N9 = 1.53172 | $\nu$9 = 48.9 |
| R16 = −64.126 | D16 = 2.12 | N10 = 1.80518 | $\nu$10 = 25.4 |
| R17 = −168.816 | D17 = Variable | | |
| R18 = Stop | D18 = 1.34 | | |
| R19 = 53.326 | D19 = 8.11 | N11 = 1.58904 | $\nu$11 = 53.2 |
| R20 = −360.591 | D20 = 2.86 | | |
| R21 = −255.099 | D21 = 3.67 | N12 = 1.84666 | $\nu$12 = 23.9 |
| R22 = 471.331 | D22 = 68.36 | | |
| R23 = −28.220 | D23 = 3.67 | N13 = 1.80610 | $\nu$13 = 40.9 |
| R24 = −60.233 | D24 = 4.23 | | |
| R25 = 176.763 | D25 = 9.66 | N14 = 1.53172 | $\nu$14 = 48.9 |
| R26 = −68.476 | | | |

| Lens Separations during Zooming with Object at Infinity | | | |
|---|---|---|---|
| f (mm) | D5 | D10 | D12 (Object at 1.5 m) | D17 |
| 100 | 0.90 | 43.87 | 1.32 | 26.06 |
| 163 | 35.91 | 28.23 | 3.26 | 6.69 |
| 260 | 56.44 | 4.80 | 7.48 | 9.59 |

EXAMPLE 2

| F = 100–250 | FNO = 1:4.0 | $2\omega$ = 18.8°–46.8° |
|---|---|---|

-continued

| | | | |
|---|---|---|---|
| R1 = 207.712 | D1 = 3.32 | N1 = 1.80518 | ν1 = 25.4 |
| R2 = 100.973 | D2 = 16.87 | N2 = 1.61484 | ν2 = 51.2 |
| R3 = 543.582 | D3 = 0.19 | | |
| R4 = 141.033 | D4 = 11.88 | N3 = 1.71300 | ν3 = 53.2 |
| R5 = 1861.842 | D5 = Variable | | |
| R6 = −1013.560 | D6 = 4.89 | N4 = 1.77250 | ν4 = 49.6 |
| R7 = 51.017 | D7 = 9.31 | | |
| R8 = −209.221 | D8 = 3.62 | N5 = 1.78800 | ν5 = 47.4 |
| R9 = 142.253 | D9 = 3.59 | | |
| R10 = 88.621 | D10 = 7.99 | N6 = 1.78472 | ν6 = 25.7 |
| R11 = −819.918 | D11 = Variable | | |
| R12 = −130.126 | D12 = 4.36 | N7 = 1.64769 | ν7 = 33.8 |
| R13 = −55.927 | D13 = 3.75 | N8 = 1.62374 | ν8 = 47.1 |
| R14 = 388.404 | D14 = Variable with focusing | | |
| R15 = 450.192 | D15 = 5.43 | N9 = 1.51742 | ν9 = 52.4 |
| R16 = −388.417 | D16 = Variable | | |
| R17 = Stop | D17 = 2.29 | | |
| R18 = 144.015 | D18 = 8.69 | N10 = 1.69680 | ν10 = 55.5 |
| R19 = −195.375 | D19 = 0.20 | | |
| R20 = 126.956 | D20 = 9.06 | N11 = 1.48749 | ν11 = 70.1 |
| R21 = −98.946 | D21 = 3.18 | N12 = 1.74950 | ν12 = 35.3 |
| R22 = 525.051 | D22 = 0.62 | | |
| R23 = 54.511 | D23 = 4.07 | N13 = 1.76182 | ν13 = 26.6 |
| R24 = 42.250 | D24 = 9.29 | N14 = 1.51633 | ν14 = 64.1 |
| R25 = 109.670 | D25 = 58.99 | | |
| R26 = 254.595 | D26 = 7.03 | N15 = 1.51454 | ν15 = 54.7 |
| R27 = −124.918 | D27 = 7.40 | | |
| R28 = −41.924 | D28 = 4.90 | N16 = 1.74320 | ν16 = 49.3 |
| R29 = −175.049 | D29 = 3.93 | | |
| R30 = 124.026 | D30 = 9.11 | N17 = 1.51823 | ν17 = 59.0 |
| R31 = −434.947 | | | |

| | Lens Separations during Zooming with Object at Infinity | | | |
|---|---|---|---|---|
| f (mm) | D5 | D11 | D14 (Object at 1.5 m) | D16 |
| 100 | 3.16 | 63.54 | 2.70 | 12.47 |
| 170 | 42.61 | 21.19 | 5.45 | 15.37 |
| 250 | 64.61 | 13.36 | 9.19 | 1.20 |

FIG. 8 exemplifies application of the feature of the invention to the variator which represents a third embodiment of the zoom lens according to the invention along with the paths of movement of the zoom units.

The zoom lens comprises, from front to rear, a first unit I having a positive refractive power, a second group II having a positive refractive power axially movable when zooming, a third unit III axially movable for compensating for the image shift resulting from the zooming, and fixed fourth and fifth units IV and V, wherein the second unit II is made to move, as a unit, during zooming.

The second unit II is constructed with a plurality of lens parts, whereby focusing is performed by moving one of the lens parts. In this embodiment, the second unit II is constructed with two lens parts, or a second-1st lens part II$_1$ and a second-2nd lens part II$_2$, one of which is given the focusing provision. Instead of the illustrated embodiment, it is also possible to apply the present invention to another type of zoom lens where the second unit is comprised of two lens parts which are moved in different relation to each other during zooming.

A third example of the specific zoom lens of the type shown in connection with FIG. 8 has the following values of the focal lengths for the unit and of the intervals between the successive principal points of the units.

| | | Principal Point Interval | |
|---|---|---|---|
| Lens Groups | Focal Length | Wide Angle Setting f = 70 mm | Telephoto Setting f = 200 mm |
| 1st | 108.3 | 5.95 | 47.95 |
| 2-1st | 119.6 | 2.7 | 2.7 |
| 2-2nd | −25.9 | 42.9 | 9.88 |
| 3rd | 94.3 | 30.0 | 21.02 |
| 4th | 87.7 | 50.0 | 50.0 |
| 5th | −157.4 | | |

In the specific case of Example 3, upon evaluation of the distance by which a different one of the units is selectively moved from a position for an infinitely distant object to effect focusing down to an object distance of 1.5 m measured from the image plane, the following results are obtained.

| | Required Value of Distance | |
|---|---|---|
| Focusing Groups | (Wide Angle setting) | (Telephoto) setting) |
| 1st | 9.770 | 9.770 |
| 2-1st (II$_1$) | 3.656 | 6.599 |
| 4th | 2.329 | 15.203 |
| 5th | 2.117 | 19.229 |

It is to be understood from the data that, of the parts of the second unit which axially move, as a unit, during zooming, the use of the second-1st lens group as the focusing lens provides the possibility of minimizing the difference in the focusing lens movement between the wide angle and telephoto settings, and that this is very advantageous in driving the focusing lens to move.

Discussion is then had about another case where the unit either for variation of the image magnification, or for maintenance of the image plane in the constant position consists of a plurality of lens parts which move in different paths from each other during zooming, and the focusing provision is made in one of the lens parts.

In this case too, when that unit has its duty of varying the image magnification, it is often desired to satisfy the following condition:

$$|f'_F| > |f'_V|$$

where $f'_F$ is the focal length of the focusing lens unit, and $f'_V$ is the overall focal length of all the lens parts in the varifocal unit.

Also when that unit has its duty of maintaining the constant position of the image plane, it is often desired to satisfy the following condition:

$$|f'_F| > |f'_C|$$

where $f'_C$ is the overall focal length of the lens parts in the unit.

Next, we show an example of application of this rule or feature of the present invention to a zoom lens comprising a first unit I counting from the front which is held stationary during zooming, followedd rearwardly by two variators and one compensator which move in different relation to one another to effect zooming, and having the focusing provision in one of the two variators.

The zoom lens comprises, from front to rear, a fixed first unit I of positive power, and a zoom section which comprises from front to rear, a second-1st part II$_1$ of positive power, a second-2nd part II$_2$ of negative power, and a second-3rd part II$_3$ of positive or negative power, wherein an independent movement is imparted into the second-1st part II$_1$ to effect focusing. Letting s and t denote the speeds of movement of the second-1st and second-2nd parts II$_1$ and II$_2$ during zooming, it is preferred to satisfy the following condition:

$$0.1 < s/t < 1.2 \quad (1)$$

The aforesaid second-1st part II$_1$ monotonously moves rearward as zooming is performed from the wide angle to the telephoto position. By moving this second-1st part II$_1$ toward an object, focusing is effected down to shorter object distances. Therefore, upon tracing of rays of light coming from an infinitely distant object and leaving the first unit in the paraxial region through the second-1st part, it is found that the ratio of the angle of incidence, α, of a principal ray to the angle of emergence, α', or α/α', is always similar than unity with a positive sign. For this reason, the use of the second-1st part as the focusing lens assures that the direction of movement of the focusing lens is always constant or forward when the object distance changes from infinity to a shortest one, no matter what focal length the zoom lens may take. In other words, there is no possibility of occurrence of a discontinuity in the focusing movement at a zooming position.

Another advantage is that though the value of the distance the second-1st part II$_1$ moves to effect focusing down to one and the same object distance increases as zooming from the wide angle to the telephoto position, since, at the same time, the air space available for the focusing operation or the one between the first unit I and the second-1st part II$_1$, also increases in the longitudinal direction, it is only required that the air separation necessary for the entire focusing range is, at most, taken at a value corresponding to the wide angle position, thereby the wasteful space in the zoom lens optical system is limited to a minimum, thus permitting a great improvement of the compactness of the zoom lens to be achieved.

Further as will be seen from a fourth specific embodiment of the zoom lens of this type, the distance the focusing lens moves from the position for an infinitely distant object to a position for an object distance of 2 meters is 2.4 mm when in the wide angle position and 3.6 mm when in the telephoto position, the ratio of the latter to the former being 1.5 as is found to be remarkably smaller than the square of the zoom ratio, or 8.16. Also in a fifth specific embodiment to be described later, because the s and t are equal to each other, the zooming operation of the second-1st and second-2nd parts may be controlled by the same can. Since another zoom control cam for the second-3rd part is additionally provided, the total necessary number of zoom control cams is only two and this simplifies the structure of the operating mechanism.

As to the required value of the distance the focusing lens moves from the position for an infinitely distant object to a position for an object distance of 1.5 meters, it is 3.2 mm when in the wide angle position, and 5.85 mm when in the telephoto position, the ratio being 1.83 as is found to be remarkably small compared with the square of the zoom ratio, or 8.16.

Another advantage of this zoom lens is that because of the fact that rays of light, after having been once converged by the first unit of positive power, arrive at the second-1st part II$_1$, the effective diameter of the second-1st lens part II$_1$ is considerably smaller than that of the first unit I. Therefore, the lens thickness may also be reduced. Thus, a great reduction in the weight of the focusing lens can be achieved as compared with the first unit I, facilitating improved results with respect to compactness. In addition thereto, the use of the zooming arrangement of the second-1st part II$_1$ and second-2nd group II$_2$ specified by the inequalities of condition (1) leads to further improvement in compactness.

When the upper limit of the inequalities of condition (1) is exceeded, the air separation between the second-1st and second-2nd parts II$_1$ and II$_2$ in the wide angle positions becomes too open to prevent the entire lens system from being increased in the longitudinal direction. When the lower limit is exceeded, since the air separation between the first group and the second-1st part is somewhat short, despite the air separation between the second-1st and second-2nd part decreases with zooming to the wide angle positions, the effective diameter of the second-1st lens part II$_1$ does not become very small as compared with the first group I, making it difficult to achieve a further reduction of the weight of the zoom lens.

Further in this zoom lens, the refractive power of the second-2nd part II$_2$ is made negative, and the direction of zooming movement thereof is made the same as that of zooming movement of the second-1st part II$_1$, for the separations between the parts are efficiently used to achieve an advance in the compactness. Also as the second-3rd part II$_3$ axially moves to compensate for the image shift resulting from the zooming, its refractive power may be made either positive or negative depending upon the desired different relation.

In this zoom lens, an additional or third unit III for image formation may be used in rear of the zoom section.

The use of such or third unit III makes it easier to achieve good stability of aberration correction throughout the entire zooming range. Further when the third unit unit III is followed by a fourth unit IV, it becomes easy to hold the Petzval sum of the entire system within good limits, permitting a zoom lens of high performance to be achieved.

Figure 9:
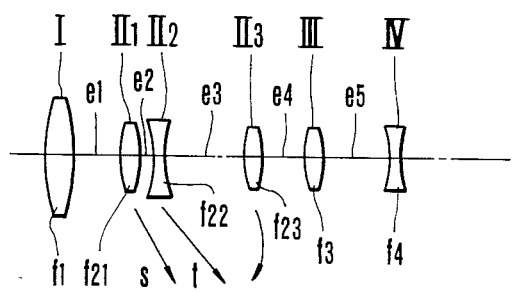
FIG. 9 is a schematic lens block diagram of a fourth embodiment of the zoom lens according to the present invention.
Figure 11:
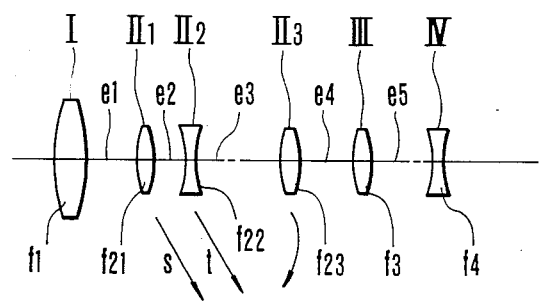
FIG. 11 is a schematic lens block diagram of a fifth embodiment of the zoom lens according to the present invention.

FIGS. 9 and 11 schematically illustrate the form, construction and arangement of the units of this type of zoom lens where I is a fixed first unit of positive power; II$_1$, II$_2$ and II$_3$ are movable parts of a second unit for zooming, the II$_1$ being a second-1st part having a positive power and arranged upon focusing down to move forward, the II$_2$ being a second-2nd part of negative power, and the II$_3$ being a second-3rd part of positive power, the latter two being stationary during focusing. The second-1st part II$_1$ and the second-2nd unit II$_2$ are moved rearward during zooming from the wide angle to the telephoto positions, while the second-3rd unit II$_3$ is simultaneously moved reciprocally, first toward the image plane then toward the object. III is a third unit of positive power, and IV is a fourth unit of negative power, both of which are held stationary not only during zooming but also during focusing.

The numerical data for the lens of FIG. 9 as a specific Example 4 and those for the lens of FIG. 11 as a specific Example 5 are given in the following Tables for the focal lengths, f, of the entire system, the focal length, fi, of the i-th group, the interval, e$_1$, between the principal points of the first unit I and second-1st part II$_1$, that, e$_2$, between the principal points of the second-1st and second-2nd parts II$_1$ and II$_2$, that, e$_3$, between the principal points of the second-2nd and second-3rd parts $II_2$ and $II_3$, that $e_4$, between the principal points of the second-3rd part $II_3$ and third unit III, and that, $e_5$, between the principal points of the third and fourth unit III and IV.

EXAMPLE 4

| Focal Length | f = 70 | f = 140 | f = 200 |
|---|---|---|---|
| $f_1$ 108.328 | $e_1$ 5.95 | $e_1$ 28.35 | $e_1$ 35.35 |
| $f_{2-1}$ 119.615 | $e_2$ 2.7 | $e_2$ 7.244 | $e_2$ 8.664 |
| $f_{2-2}$ −25.889 | $e_3$ 42.889 | $e_3$ 22.815 | $e_3$ 5.889 |
| $f_{2-3}$ 94.261 | $e_4$ 50 | $e_4$ 43.129 | $e_4$ 51.636 |
| $f_3$ 87.716 | $e_5$ 50 | $e_5$ 50 | $e_5$ 50 |
| $f_4$ −157.381 | | | |

EXAMPLE 5

| Focal Length | f = 70 | F = 140 | f = 200 |
|---|---|---|---|
| $f_1$ 108.328 | $e_1$ 5.95 | $e_1$ 38.367 | $e_1$ 48.05 |
| $f_{2-1}$ 119.615 | $e_2$ 2.7 | $e_2$ 2.7 | $e_2$ 2.7 |
| $f_{2-2}$ −25.889 | $e_3$ 42.889 | $e_3$ 25.018 | $e_3$ 9.784 |
| $f_{2-3}$ 94.261 | $e_4$ 50 | $e_4$ 35.454 | $e_4$ 41.005 |
| $f_3$ 87.716 | $e_5$ 50 | $e_5$ 50 | $e_5$ 50 |
| $f_4$ −157.381 | | | |

Figure 10:
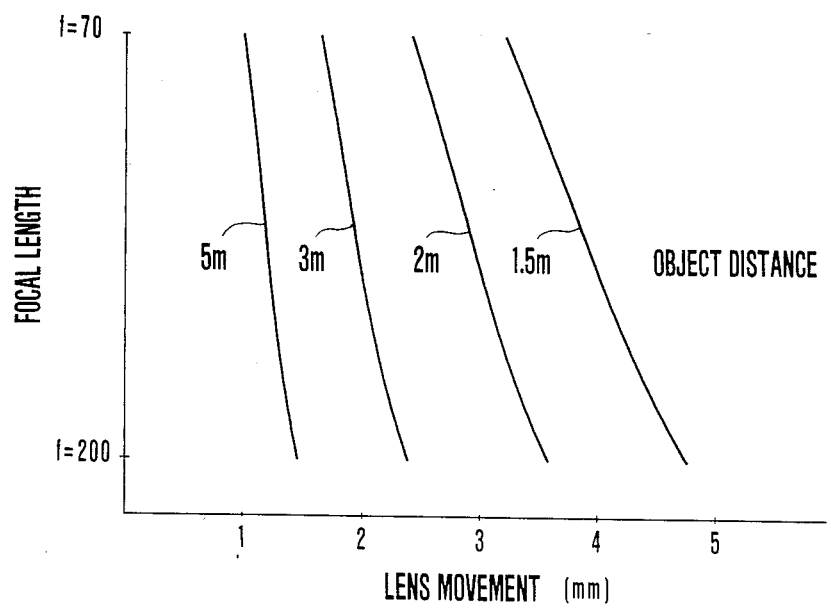
FIG. 10 is a graph illustrating variations with zooming of the focusing movement in the lens of FIG. 9.
Figure 12:
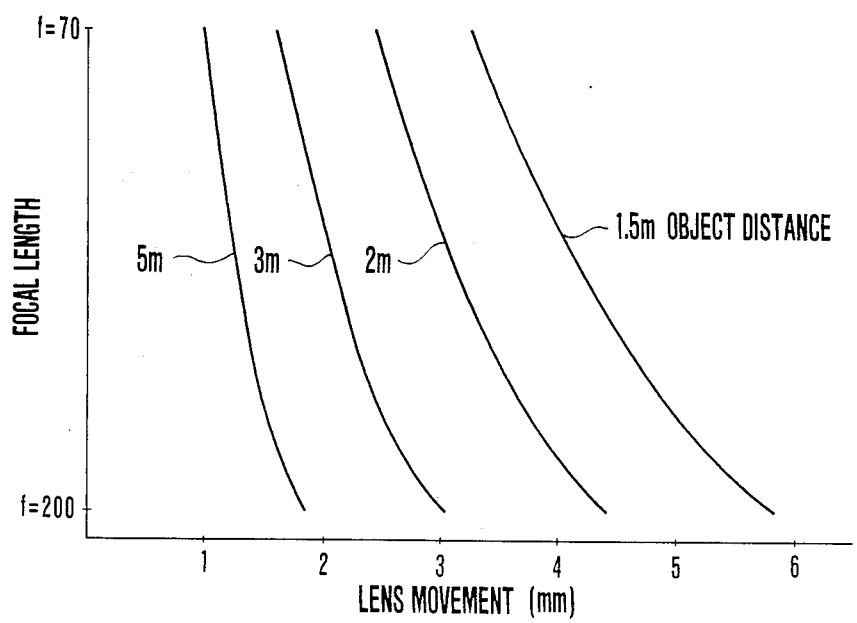
FIG. 12 is a graph illustrating variations with zooming of the focusing movement in the lens of FIG. 11.

FIG. 10 for the zoom lens of FIG. 9, and FIG. 12 for the lens of FIG. 11, illustrate how to move the second-1st part $II_1$ for focusing down to object distance of 1.5, 2, 3 and 5 meters as a function of the focal length of the entire system. In the graphs of FIGS. 10 and 12, the ordinate is in the focal length of the entire system, and the abscissa is in the distance the focusing or second-1st part moves from the position for an infinitely distant object, with a parameter in the object distance. As is evident from these graphs, it is understood that for each object distance, the difference in the distance between the wide angle and telephoto positions is not very large.

What we claim:

1. A zoom lens comprising:
   a variation lens unit axially movable for varying the focal length of the entire system; and
   a lens unit axially movable in accordance with movement of said variation lens unit to maintain the constant position of an image plane,
   said variation lens unit including a lens component which is movable over the entire zooming range and made movable to effect focusing from an infinity object to a close object, and another lens component which is held stationary during focusing, said two lens components moving in different paths during the zooming.

2. A zoom lens as described in claim 1, wherein an absolute value of a focal length of said lens component movable when in focusing is larger than an absolute value of the focal length of said variation lens unit.

3. A zoom lens comprising:
   at least one variator lens unit axially movable for varying the focal length of the zoom lens; and
   at least one compensator lens unit axially movable in accordance with movement of said variator lens unit to maintain the constant position of an image plane,
   one lens part of said variator lens units includes a plurality of lens elements, part of said lens elements when in focusing being moved, over the entire zooming range, to effect focusing from an infinity object to a close object, said lens elements moving in different paths during the zooming.

4. A zoom lens as described in claim 3, wherein an absolute value of the focal length of said lens element or elements movable for focusing is larger than an absolute value of the focal length of said lens part.

5. A zoom lens comprising:
   a first lens unit having a positive power which is stationary during zooming and focusing;
   a second lens unit arranged on the image side of said first lens unit upon zooming to move to vary the image magnification and having a negative power, said second lens unit being including, from front to rear, a first lens part and a second lens part, wherein by moving either one of said first lens part and said second lens part, focusing is performed from an infinity object to a close object in the entire zooming range, said first lens part and said second lens part moving in different paths during zooming;
   a third lens unit arranged on the image side of said second lens unit upon zooming to move to maintain the constant position of an image plane and having a positive power; and
   a fourth lens unit arranged on the image side of said third lens unit to be stationary during zooming and focusing, and having a positive power.

6. A zoom lens comprising:
   a front lens unit stationary during zooming and focusing;
   a plurality of movable lens units arranged on the image side of said front lens unit and movable in a predetermined relation to each other to change the focal length of the whole lens system and to maintain the image plane at a constant position; and
   a rear lens unit arranged on the image side of said movable lens units and stationary during zooming and focusing, one of said movable lens units having a plurality of sub-units which move in different paths during zooming with one of said sub-units moving along the optical axis to cause the zoom lens to focus from an infinity to a close object.

7. A zoom lens according to claim 6, in which said sub-units move unitedly during zooming.

* * * * *